(12) United States Patent
Guillot et al.

(10) Patent No.: US 8,962,145 B2
(45) Date of Patent: Feb. 24, 2015

(54) WEAKLY ANIONIC POLYMERS, USES THEREOF

(71) Applicant: Coatex S.A.S., Genay (FR)

(72) Inventors: Murielle Guillot, Wambrechies (FR); Olivier Guerret, Pern (FR); Francois Dupont, Lyons (FR)

(73) Assignee: Coatex, Genay (FR)

( * ) Notice: Subject to any disclaimer, the term of this patent is extended or adjusted under 35 U.S.C. 154(b) by 151 days.

(21) Appl. No.: 13/680,175

(22) Filed: Nov. 19, 2012

(65) Prior Publication Data
US 2013/0130046 A1    May 23, 2013

Related U.S. Application Data

(60) Provisional application No. 61/562,773, filed on Nov. 22, 2011.

(30) Foreign Application Priority Data

Nov. 18, 2011   (FR) ..................... 11 03520

(51) Int. Cl.
| | |
|---|---|
| B32B 27/10 | (2006.01) |
| D21H 19/00 | (2006.01) |
| C09D 133/10 | (2006.01) |
| B05D 3/02 | (2006.01) |
| B41M 5/52 | (2006.01) |
| D21H 17/66 | (2006.01) |
| D21H 19/58 | (2006.01) |

(52) U.S. Cl.
CPC ............. *C09D 133/10* (2013.01); *B41M 5/52* (2013.01); *D21H 17/66* (2013.01); *D21H 19/58* (2013.01); *B41M 5/5254* (2013.01); *B41M 5/5218* (2013.01); *B41M 5/5227* (2013.01)
USPC ........... 428/511; 524/186; 524/425; 524/436; 524/558; 427/391

(58) Field of Classification Search
CPC .... C09D 133/10; C09D 133/14; D21H 19/18; D21H 17/66; C08K 3/0033
USPC .................. 524/558, 436, 425, 186
See application file for complete search history.

(56) References Cited

U.S. PATENT DOCUMENTS

2010/0314061 A1* 12/2010 Guerret et al. ................ 162/152

FOREIGN PATENT DOCUMENTS

| FR | 2 810 261 | 12/2001 |
|---|---|---|
| FR | 2 950 061 | 3/2011 |
| WO | WO 99/41086 | 8/1999 |

OTHER PUBLICATIONS

U.S. Appl. No. 13/834,547, filed Mar. 15, 2013, Guillot, et al.

* cited by examiner

*Primary Examiner* — Vu A Nguyen
(74) *Attorney, Agent, or Firm* — Oblon, Spivak, McClelland, Maier & Neustadt, L.L.P.

(57) ABSTRACT

The present invention concerns weakly anionic polymers including their use in paper coatings, especially those intended for paper for inkjet printing. These additives provide the sought thickening function, while improving water retention very appreciably. The invention also concerns a method of manufacture of such coatings, together with the coatings obtained in this manner.

16 Claims, No Drawings

US 8,962,145 B2

WEAKLY ANIONIC POLYMERS, USES THEREOF

REFERENCE TO PRIOR APPLICATIONS

This application claims priority to U.S. provisional application Ser. No. 61/562,773, filed Nov. 22, 2011; and to French patent application 11 03520, filed Nov. 18, 2011, both incorporated herein by reference.

FIELD OF THE INVENTION

The present invention relates to weakly anionic polymers, and their various uses. Use in paper coatings is preferred. In paper coatings intended for inkjet-type printing, salts or cationic species must be introduced to fix the ink droplets to the surface of the base paper. However, when used in large quantities these products can destabilise the medium. The present invention provides an advantage in this area by using certain rheological additives which both allow the viscosity of the medium to be regulated in order to prevent any destabilisation problems and enable the coating's water retention to be improved advantageously.

Additional advantages and other features of the present invention will be set forth in part in the description that follows and in part will become apparent to those having ordinary skill in the art upon examination of the following or may be learned from the practice of the present invention. The advantages of the present invention may be realized and obtained as particularly pointed out in the appended claims. As will be realized, the present invention is capable of other and different embodiments, and its several details are capable of modifications in various obvious respects, all without departing from the present invention. The description is to be regarded as illustrative in nature, and not as restrictive.

BACKGROUND OF THE INVENTION

In describing the background of the invention it is the intention of the inventors to prime the reader for a greater understanding of the invention. In doing so certain documents, patents, etc. may be described. These documents speak for themselves, and although any discussion of their contents herein is believed to be accurate, any inadvertent mischaracterization does not constitute an admission.

Inkjet printing technology allows a base paper to be printed using droplets of ink. These are ejected or propelled from different mechanical means to a paper medium, on which they form points which create the corresponding text or image.

The intrinsic qualities of this technology account for its rapid development: possibility of high-speed, contact-free and impact-free printing, with high definition, thus giving access to high-quality colour images. Independently, progress made in the fields of electronics and computing is contributing to the constant improvement of computers and digital cameras; this development of the hardware, combined with the low purchase price of inkjet printers, is leading increasing numbers of users to take up this printing technology. This technology is currently used both by professionals and by the general public to print objects as diverse as letters, reports, brochures, magazines, postcards, digital photographs, labels, posters, etc.

There are currently considered to be 2 families of media for inkjet: "ordinary" papers and "special" papers. The former are used for more inexpensive low- to medium-quality printing. The latter are recommended when a high rendering of the image or of the text to be printed is expected, and they are obtained at higher costs. The major difference between these 2 categories lies in the application of a water-based coating to the surface of the medium:

of low coat weight and with inexpensive organic and mineral compounds in the case of ordinary papers;
of higher coat weight and with more sophisticated and expensive organic or mineral compounds in the case of special papers.

This coating is called a "paper coating": it is an aqueous formulation, conventionally containing water, at least one mineral filler, one or more binders, and also various additives. In paper coatings intended for inkjet-type printing, either mineral or organic salts, or cationic species, can be introduced, the primary function of which is to fix the ink at the moment when the latter reaches the surface of the paper in the form of droplets. Documents WO 2009/110910, WO 2010/068193 and WO 2011/008218 give two examples of such formulations containing salts, while document WO 2007/112013 concerns paper coatings containing cationic species; all these documents relate to inkjet technology.

The mineral filler introduced into the paper coating is conveyed in the form of an aqueous suspension. Conventionally, this filler is a calcium carbonate, suspended in water by means of a dispersing agent.

The most widespread dispersing agents are anionic polymers of low molecular weight (less than 10,000 g/mol) which are homopolymers of acrylic acid. With this regard, patent applications FR 2 488 814, FR 2 603 042, EP 0 100 947, EP 0 100 948, EP 0 129 329, EP 0 542 643 and EP 0 542 644 may be cited. But weakly anionic dispersing agents, which are copolymers of low molecular weights of acrylic acid, can also be used with a monomer of the methoxy or hydroxy oxyalkylated type; examples of such will be found in document WO 01/096007.

This being so, when the formulation of the paper coating is produced by blending between the different constituents listed above, the introduction of the salt or cationic compound may cause a problem when a rheology agent, the function of which is to regulate the viscosity, and to improve the water retention of the said coating, is introduced in addition. These two parameters improve control of the coating method, spreading quality on the base paper and maintenance of the active compounds of the paper coating on the surface of the paper.

Conventional rheology agents are generally anionic polymers, concerning which it has been observed that introducing them into coatings for inkjets containing salts or a cationic compound causes a violent flocculation reaction, shown by a high rise in viscosity, without any noteworthy improvement of water retention.

DETAILED DESCRIPTION OF THE PREFERRED EMBODIMENTS

The inventors have developed new weakly anionic polymer additives, and developed their use in these paper coatings, and have found that these additives surprisingly provide the sought thickening function whilst improving water retention very appreciably.

These additives are hydrosoluble polymers that comprise, consist, and consist essentially of, expressed as a % by weight of each of their monomers, of:
a) 5% to 40%, preferentially 5% to 20% of (meth)acrylic acid,
b) 60% to 95%, preferentially 80% to 95%, of at least one monomer of formula (I):

$$R\text{-}(EO)_m\text{-}(PO)_n\text{-}R' \qquad (I)$$

where R is a polymerizable group chosen from among the methacrylate and methacrylurethanne group, EO and PO designate respectively ethylene and propylene oxides, m and n are 2 integers, at least one of which is non-zero, and are between 0 and 100 inclusively, and R' designates hydrogen or an alkyl group having 1 to 4 carbon atoms, where the percents given preferably total to at least 70%, more preferably 85%, even more preferably greater than 95% (including 100%) based on the total weight of monomers in the hydrosoluble polymers.

As used herein, the term "(meth)acrylic acid" means methacrylic acid and acrylic acid, and supports both terms individually. Also, while those of skill in the art understand that polymers contain monomers in their polymerized form, it is accepted shorthand to describe polymers simply as containing monomers, as above.

Another object of the present invention is a method of manufacture of a paper coating composition useful for example for coating a base paper for inkjet printing, comprising:

1) blending an aqueous suspension of a mineral filler containing a dispersing agent with at least one binder, to provide a medium,
2) introducing into the medium at least one organic salt or one mineral salt, or at least one cationic compound and
3) introducing into the medium at least one hydrosoluble polymer described above.

As described here, the order is preferred but not mandatory. That is, the ingredients in 1), 2) and 3) can be combined in any order.

A base paper, for example one especially suited for inkjet printing, can be coated in whole or in part with this composition by any coating method, and optionally dried.

Another object of the present invention lies in the use, as a stabilisation agent of a paper coating intended for example for a base paper for inkjet printing, containing water, at least one mineral filler in aqueous suspension in the presence of a dispersing agent, at least one binder, at least one mineral or organic salt or one cationic compound, of at least one hydrosoluble polymer described above Another object of the present invention lies in a paper coating that can be used on a base paper for inkjet printing, containing water, at least one mineral filler in aqueous suspension in the presence of a dispersing agent, at least one binder, at least one mineral salt or one organic salt or one cationic compound, and at least one hydrosoluble polymer described above.

In each embodiment herein, the hydrosoluble polymer optionally can be totally or partially neutralized.

According to another embodiment the hydrosoluble polymer's molecular mass by weight, as determined by GPC, is preferably between 10,000 g/mol and 10,000,000 g/mol. In a first variant embodiment, polymers known as "low molecular mass" polymers, notably having a molecular mass of between 10,000 g/mol and 100,000 g/mol, are used. In a second variant embodiment, polymers known as "high molecular mass" polymers, having a molecular mass of between 1,000,000 g/mol and 10,000,000 g/mol, are used. Combinations can also be used.

"Salt" is understood to mean a substance in an ionic form consisting of cations and anions forming a neutral product without a neutral filler. Mineral salts are conventionally derived from rocks; organic salts contain carbon, hydrogen and oxygen.

Examples of mineral salts are calcium chloride, magnesium chloride, sodium chloride, potassium chloride, calcium bromide, sodium sulphate or blends of these salts. Examples of organic salts are sodium acetate, potassium acetate, sodium citrate, calcium citrate or blends of these salts.

In each embodiment herein, the paper coating can contain at least one mineral salt which is calcium chloride.

"Cationic compound" according to the present invention is understood to mean a compound having a positive charge, and the function of which is to fix the ink to the surface of the paper.

In each embodiment herein the paper coating can contain a cationic compound which is preferably chosen from among the polyDADMACs, the polyMADQUATs and the polyamines.

"Binder" is understood to mean a compound having the function of binding the particles of mineral filler (or pigments) to one another, and of holding the layer at the surface of the paper. As examples of binders according to the present invention, one may cite the hydrosoluble binders such as CMC, PVOH, starch and/or the synthetic latexes (styrene-butadiene, styrene-acrylic, polyvinyl acetate).

"Dispersing agent" is understood to mean an agent having the function of holding the particles of mineral filler in a state of electrostatic dispersion. As an example, these may be polyacrylates or polyphosphates.

In each of the embodiments herein, the mineral filler is preferably chosen from among a natural, synthetic or chemically modified calcium carbonate. According to one embodiment, the mineral filler is a natural calcium carbonate.

The term "calcium carbonate" includes ground calcium carbonate (GCC), i.e. calcium carbonate obtained from natural sources, such as limestone, marble, calcite or lime, together with precipitated calcium carbonate (PCC), i.e. a synthesised substance, generally obtained by precipitation following a reaction of carbon dioxide and calcium hydroxide (hydrated lime) in an aqueous environment, or by precipitation of a source of calcium and of carbonate in water.

"Chemically modified calcium carbonate" is understood to mean a carbonate at least one of the surface properties of which has been modified by a treatment using a chemical agent.

Aqueous suspensions of calcium carbonate are suspensions of insoluble solids in a liquid medium which is generally a blend of water and at least one additive.

In each of the embodiments herein, the dispersing agent is preferentially either an anionic or a cationic dispersing agent.

For all embodiments described and envisioned, it is clearly understood that the skilled man in the art may add to the paper coating all additives which he shall judge necessary, chosen for example in a non-exhaustive manner, from among the optical whiteners, anti-foaming agents, and biocides.

The following examples help to illustrate the invention, but do not limit it.

EXAMPLES

Example 1

This example illustrates the manufacture of a paper coating intended for a base paper for inkjet printing, where the said coating contains a cationic compound. This example illustrates the effects of different polymeric additives used, on the rheology of the said coating, and also on its water retention.

In each of tests no 1 to 15 a paper coating is produced by prior blending between an aqueous suspension of calcium carbonate, dispersed anionically, and sold by the company Omya under the name Omyajet™ 5020 Me.

A cationic polymer sold by the company Coatex™ under the name Topsperse™ 67 K is added to a quantity equal to 7.5 parts by dry weight for 100 parts by dry weight of calcium carbonate.

A binder is then added which is vinyl polyacetate sold by the company Celanese under the name Resyn™ 1190, so as to have 10 parts by dry weight of binder for 100 parts by dry weight of calcium carbonate.

Finally, the polymeric additive for testing is introduced into the coating; the quantity used and also its composition are given above.

The coatings are produced with a dry extract of 45.5% and have their pH adjusted to 8.5.

For each coating, its Brookfield™ viscosity is then determined at 25° C. and at 100 revolutions per minute, using the technique well known to the skilled man in the art, together with its water retention value, determined according to the protocol below.

The water retention is determined using a device of the AA-GWR type sold by the company GRADEK™. This device consists of a measuring chamber, in which a test paper called a "Test Blotter Paper" is placed, covered by a perforated plastic sheet called a "Test Filter PCTE", the paper and the sheet being sold by the company GRADEK™. The size of the perforations is 2 µm.

10 ml of the paper coating for testing is then introduced into the chamber.

The AA-GWR device enables a certain pressure to be exerted on the paper coating, leading all or part of the water and of the water-soluble substances contained in the coating to traverse the perforated plastic sheet and migrate into the test paper.

Specifically, a pressure of 1.5 bar is applied for 90 seconds.

The difference between the weight of the test paper before the experiment $P_0$, and after the experiment $P_1$, gives the weight of water and of water-soluble substances contained in the paper coating having migrated into the test paper during the experiment.

The difference between the weight of the test paper before the experiment $P_0$, and after the experiment $P_1$, gives the weight of water and of water-soluble substances contained in the paper coating having migrated into the test paper during the experiment.

A correction factor is applied to this difference $P_1-P_0$ expressing the water retention as a value per $m^2$ of test paper.

Less satisfactory water retentions give higher values.

Test No 1:
This test is used as a reference and does not use any polymeric additive.

Test No 2:
This test illustrates the prior art and uses a 0.6 parts by dry weight of a rheology agent frequently used in paper coatings: a carboxymethyl cellulose sold by the company BASF™ under the name Finnfix™ 10.

Test No 3:
This test illustrates the prior art and uses 1.2 parts by dry weight of Finnfix™ 10.

Test No 4:
This test illustrates the prior art and uses a 0.6 parts by dry weight of a rheology agent frequently used in paper coatings: this is another carboxymethyl cellulose sold by the company BASF™ under the name Finnfix™ 30.

Test No 5:
This test illustrates the prior art and uses 1.2 parts by dry weight of Finnfix™ 30.

Test No 6:
This test illustrates the prior art and uses a 0.6 parts by dry weight of a rheology agent frequently used in paper coatings: this is an aqueous emulsion of an acrylic polymer sold by the company Coatex™ under the name Rheocoat™ 66.

Test No 7:
This test illustrates the prior art and uses 1.2 parts by dry weight of Rheocoat™ 66.

Test No 8:
This test illustrates the prior art and uses a 0.6 parts by dry weight of a rheology agent frequently used in paper coatings: this is an aqueous emulsion of an associative acrylic polymer sold by the company Coatex™ under the name Rheocoat™ 73.

Test No 9:
This test illustrates the prior art and uses 1.2 parts by dry weight of Rheocoat™ 73.

Test No 10:
This test illustrates the invention and uses a 0.8 parts by dry weight of a copolymer consisting, expressed as a % by weight of each of its monomers, of:
a) 8% of acrylic acid and 2.5% of methacrylic acid,
b) 89.5% of a monomer of formula (I):

$$R\text{-}(EO)_m\text{---}(PO)_n\text{---}R' \qquad (I)$$

where R is the methacrylate group, EO and PO designate respectively the ethylene and propylene oxides, n=48 and m=16, and R' designates hydrogen of average molecular mass by weight, determined by GPC, equal to 1,800,000 g/mol.

Test No 11:
This test illustrates the invention and uses 1.2 parts by dry weight of the copolymer according to test no 10.

Test No 12:
This test illustrates the invention and uses a 0.8 parts by dry weight of a copolymer consisting, expressed as a % by weight of each of its monomers, of:
a) 6% of acrylic acid and 1.8% of methacrylic acid,
b) 92.2% of a monomer of formula (I):

$$R\text{-}(EO)_m\text{---}(PO)_n\text{---}R' \qquad (I)$$

where R is the methacrylate group, EO and PO designate respectively the ethylene and propylene oxides, n=0 and m=45, and R' designates the methyl radical of average molecular mass by weight, determined by GPC, equal to 5,000,000 g/mol.

Test No 13:
This test illustrates the invention and uses 1.2 parts by dry weight of the copolymer according to test no 12.

Test No 14:
This test illustrates the invention and uses 0.8 parts by dry weight of the copolymer according to test no 10, but of average molecular mass by weight equal to 4,200,000 g/mol.

Test No 15:
This test illustrates the invention and uses 1.2 parts by dry weight of the copolymer according to test no 14.

The values of the Brookfield™ viscosity (Bk, mPa·s) and of the water retention (PA GWR as a $g/m^2$) are shown in table 1, together with the quantity in parts by dry weight of the tested polymeric additive (parts).

TABLE 1

| Test n° | 1 | 2 | 3 | 4 | 5 |
|---|---|---|---|---|---|
| REFerence Prior Art INvention | REF | PA | PA | PA | PA |

TABLE 1-continued

| Parts | 0 | 0.6 | 1.2 | 0.6 | 1.2 |
|---|---|---|---|---|---|
| Bk (mPa · s) | 970 | 2,100 | 1,550 | 1,760 | 1,560 |
| PA GWR (g/m²) | 320 | >600 | >1,200 | >700 | >1,300 |

| Test n° | 6 | 7 | 8 | 9 | 10 |
|---|---|---|---|---|---|
| REFerence Prior Art INvention | PA | PA | PA | PA | IN |
| Parts | 0.6 | 1.2 | 0.6 | 1.2 | 0.8 |
| Bk (mPa · s) | 2,100 | 3,000 | 2,200 | 3,210 | 1,425 |
| PA GWR (g/m²) | >1,000 | >1,400 | >1,200 | >1,100 | 170 |

| Test n° | 11 | 12 | 13 | 14 | 15 |
|---|---|---|---|---|---|
| REFerence Prior Art INvention | IN | IN | IN | IN | IN |
| Parts | 1.2 | 0.8 | 1.2 | 0.8 | 1.2 |
| Bk (mPa · s) | 1,690 | 1,260 | 1,700 | 2,035 | 2,210 |
| PA GWR (g/m²) | 120 | 235 | 145 | 230 | 140 |

> signifies that calcium carbonate has traversed the filter, this carbonate having been detected by an acid test Only the polymers according to the invention lead to water retention values substantially lower than those obtained for the reference and the prior art, with perfectly acceptable Brookfield™ viscosity values.

Example 2

This example illustrates the manufacture of a paper coating intended for a base paper for inkjet printing, where the said coating contains a salt. This example illustrates the effects of different polymeric additives used, on the rheology of the said coating, and also on its water retention.

In each of tests no 16 to 20, a paper coating is produced by blending an aqueous suspension with 78% by dry weight of calcium carbonate, containing an anionic dispersing agent, and sold by the company Omya™ under the name Hydrocarb™ 90 and 10 parts by dry weight of calcium chloride.

The binder Resyn™ 1190 is then introduced. The blend is produced so as to have 100 parts by dry weight of calcium carbonate for 10 parts by dry weight of binder.

The polymeric additive for testing is then introduced into the coating; the quantity used and also its composition are given above.

The coatings are produced with a dry extract of 60% and have their pH adjusted to 8.5.

For each coating, its Brookfield™ viscosity is then determined at 25° C. and at 100 revolutions per minute, using the technique well known to the skilled man in the art, together with its water retention value, determined according to the protocol described above.

Test No 16:
This test is used as a reference and does not use any polymeric additive.

Test No 17:
This test illustrates the invention and uses 1 part by dry weight of the copolymer according to tests 14 and 15.

Test No 18:
This test illustrates the invention and uses a 1 part by dry weight of a copolymer consisting, expressed as a % by weight of each of its monomers, of:
a) 12.8% of acrylic acid,
b) 87.2% of a monomer of formula (I), in which R is the methacrylate group, R' designates hydrogen, n=48, m=16, of average molecular mass by weight equal to 45,000 g/mol, 100% of the carboxylic sites of which are neutralised by the sodium ion.

Test No 19:
This test illustrates the invention and uses 0.5 parts by dry weight of the copolymer according to tests 14, 15 and 17, and 0.2 parts by dry weight of the copolymer according to test no 18.

Test No 20:
This test illustrates the invention and uses 1 part by dry weight of the copolymer according to tests 12 and 13.

The values of the Brookfield™ viscosity (Bk, mPa·s) and of the water retention (PA GWR as a g/m²) are shown in table 2, together with the quantity in parts by dry weight of the tested polymeric additive (parts).

TABLE 2

| Test n° | 16 | 17 | 18 | 19 | 20 |
|---|---|---|---|---|---|
| REFerence Prior Art INvention | REF | IN | IN | IN | IN |
| Parts | 0 | 1.0 | 1.0 | 0.5 + 0.2 | 1.0 |
| Bk (mPa · s) | 1,520 | 900 | 900 | 730 | 950 |
| PA GWR (g/m²) | >730 | 140 | 250 | 360 | 210 |

> signifies that calcium carbonate has traversed the filter, this carbonate having been detected by an acid test Only the polymers according to the invention lead to water retention values substantially lower than those obtained for the reference and the prior art, with perfectly acceptable Brookfield™ viscosity values.

As used herein the terms composed of, contains, containing, and terms similar thereto, when referring to the ingredients, parts, reactants, etc., of a composition, component, etc., mean, in their broadest sense, "includes at least" but also include within their definition all those gradually restricted meanings until and including the point where only the enumerated materials are included.

The above written description of the invention provides a manner and process of making and using it such that any person skilled in this art is enabled to make and use the same, this enablement being provided in particular for the subject matter of the appended claims, which make up a part of the original description.

The following list of preferred embodiments are fully described herein in a manner allowing the skilled man to both make and use them:

1. A method, comprising:
  1) blending an aqueous suspension comprising mineral filler and a dispersing agent with a binder to produce a medium,
  2) introducing into the medium at least one of an organic salt, a mineral salt, and a cationic compound, and
  3) introducing into the medium a hydrosoluble polymer comprising, expressed as a % by weight based on the total weight of its monomers:
    a) 5% to 40% of (meth)acrylic acid,
    b) 60% to 95% of a monomer of formula (I):

$$R\text{-}(EO)_m\text{---}(PO)_n\text{---}R' \qquad (I)$$

where R is a polymerizable group selected from the group consisting of methacrylate and methacrylurethane, EO and PO designate ethylene and propylene oxides respectively, m and n are independent integers, at least one of which is non-zero, and are between 0 and 100 inclusively, and R' designates hydrogen or an alkyl group having 1 to 4 carbon atoms.
2. A method according to EMBODIMENT 1, wherein the hydrosoluble polymer is totally or partially neutralised.
3. A method according to one of the EMBODIMENT 1, wherein the hydrosoluble polymer has a molecular mass by weight of 10,000 g/mol-10,000,000 g/mol.
4. A method according to EMBODIMENT 1, wherein the hydrosoluble polymer has a molecular mass by weight of 10,000 g/mol-100,000 g/mol.
5. A method according to EMBODIMENT 1, wherein the hydrosoluble polymer has a molecular mass by weight of 1,000,000 g/mol-10,000,000 g/mol.
6. A method according to EMBODIMENT 1, wherein 2) comprises introducing calcium chloride into the medium.
7. A method according to EMBODIMENT 1, wherein 2) comprises introducing a cationic compound selected from the group consisting of polyDADMACs, polyMADQUATs, polyamines, and mixtures thereof.
8. A method according to EMBODIMENT 1, wherein the mineral filler is selected from the group consisting of natural, synthetic, and chemically modified calcium carbonate, and mixtures thereof.
9. A method according to EMBODIMENT 8, wherein the mineral filler is natural calcium carbonate.
10. A method according to one of the EMBODIMENT 1, wherein the dispersing agent is selected from the group consisting of anionic and cationic dispersing agents, and mixtures thereof.
11. A composition comprising water, a mineral filler, a dispersing agent, a binder, at least one of a mineral salt, an organic salt and a cationic compound, and a hydrosoluble polymer comprising, expressed as a % by weight based on the total weight of its monomers:
a) 5% to 40% of (meth)acrylic acid,
b) 60% to 95% of a monomer of formula (I):

$$R\text{-}(EO)_m\text{-}(PO)_n\text{-}R' \qquad (I)$$

where R is a polymerizable group selected from the group consisting of methacrylate and methacrylurethane, EO and PO designate ethylene and propylene oxides respectively, m and n are independent integers, at least one of which is non-zero, and are between 0 and 100 inclusively, and R' designates hydrogen or an alkyl group having 1 to 4 carbon atoms.
12. A composition according to EMBODIMENT 11, wherein the hydrosoluble polymer has a molecular mass by weight of 10,000 g/mol-10,000,000 g/mol.
13. A composition according to EMBODIMENT 11, wherein the hydrosoluble polymer is totally or partially neutralised.
14. A method, comprising applying the composition of EMBODIMENT 11 on a base paper.
15. The method of EMBODIMENT 14, further comprising drying said composition.
16. A coated base paper prepared according to the method of EMBODIMENT 15.

As used herein, the phrases "selected from the group consisting of," "chosen from," and the like include mixtures of the specified materials. The term "mentioned" notes exemplary embodiments, and is not limiting to certain species.

As used herein the words "a" and "an" and the like carry the meaning of "one or more."

All references, patents, applications, tests, standards, documents, publications, brochures, texts, articles, etc. mentioned herein are incorporated herein by reference. Where a numerical limit or range is stated, the endpoints are included. Also, all values and subranges within a numerical limit or range are specifically included as if explicitly written out.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. In this regard, certain embodiments within the invention may not show every benefit of the invention, considered broadly.

The invention claimed is:
1. A method, comprising:
1) blending an aqueous suspension comprising mineral filler and a dispersing agent with a binder to produce a medium,
2) introducing into the medium at least one of an organic salt, a mineral salt, and a cationic compound, and
3) introducing into the medium a hydrosoluble polymer comprising, expressed as a % by weight based on the total weight of its monomers:
a) 5% to 40% of (meth)acrylic acid,
b) 60% to 95% of a monomer of formula (I):

$$R\text{-}(EO)m\text{-}(PO)n\text{-}R' \qquad (I)$$

where R is a polymerizable group selected from the group consisting of methacrylate and methacrylurethane, EO and PO designate ethylene and propylene oxides respectively, m and n are independent integers, at least one of which is non-zero, and are between 0 and 100 inclusively, and R' designates hydrogen or an alkyl group having 1 to 4 carbon atoms.
2. A method according to claim 1, wherein the hydrosoluble polymer is totally or partially neutralised.
3. A method according to claim 1, wherein the hydrosoluble polymer has a molecular mass by weight of 10,000 g/mol-10,000,000 g/mol.
4. A method according to claim 1, wherein the hydrosoluble polymer has a molecular mass by weight of 10,000 g/mol-100,000 g/mol.
5. A method according to claim 1, wherein the hydrosoluble polymer has a molecular mass by weight of 1,000,000 g/mol-10,000,000 g/mol.
6. A method according to claim 1, wherein 2) comprises introducing calcium chloride into the medium.
7. A method according to claim 1, wherein 2) comprises introducing a cationic compound selected from the group consisting of polyDADMACs, polyMADQUATs, polyamines, and mixtures thereof.
8. A method according to claim 1, wherein the mineral filler is selected from the group consisting of natural, synthetic, and chemically modified calcium carbonate, and mixtures thereof.
9. A method according to claim 8, wherein the mineral filler is natural calcium carbonate.
10. A method according to one of the claim 1, wherein the dispersing agent is selected from the group consisting of anionic and cationic dispersing agents, and mixtures thereof.
11. A paper coating composition for ink jet printing paper, consisting essentially of water, a mineral filler, a dispersing agent, a binder, at least one of a mineral salt, an organic salt and a cationic compound, and a hydrosoluble polymer comprising, expressed as a % by weight based on the total weight of its monomers:
 a) 5% to 40% of (meth)acrylic acid,
 b) 60% to 95% of a monomer of formula (I):

$$R\text{-}(EO)_m\text{—}(PO)_n\text{—}R' \qquad (I)$$

where R is a polymerizable group selected from the group consisting of methacrylate and methacrylurethane, EO and PO designate ethylene and propylene oxides respectively, m and n are independent integers, at least one of which is non-zero, and are between 0 and 100 inclusively, and R' designates hydrogen or an alkyl group having 1 to 4 carbon atoms.

12. A paper coating composition according to claim 11, wherein the hydrosoluble polymer has a molecular mass by weight of 10,000 g/mol-10,000,000 g/mol.

13. A paper coating composition according to claim 11, wherein the hydrosoluble polymer is totally or partially neutralised.

14. A method, comprising applying the composition of claim 11 on a base paper.

15. The method of claim 14, further comprising drying said composition.

16. A coated base paper prepared according to the method of claim 15.

* * * * *